United States Patent
Strohm et al.

(10) Patent No.: US 8,772,993 B2
(45) Date of Patent: Jul. 8, 2014

(54) ELECTRIC MOTOR WITH ADHESIVELY BONDED RING MAGNET

(75) Inventors: Rainer Strohm, St. Georgen (DE); Tobias Maier, Rottweil (DE); Volker Hildebrand, Rust (DE); Juergen Pfaff, Herbolzheim (DE); Arno Karwath, Deisslingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 849 days.

(21) Appl. No.: 12/741,027

(22) PCT Filed: Jul. 21, 2008

(86) PCT No.: PCT/EP2008/005941
§ 371 (c)(1),
(2), (4) Date: Apr. 30, 2010

(87) PCT Pub. No.: WO2009/056180
PCT Pub. Date: May 7, 2009

(65) Prior Publication Data
US 2010/0264758 A1    Oct. 21, 2010

(30) Foreign Application Priority Data
Oct. 31, 2007 (DE) .......................... 10 2007 054 322

(51) Int. Cl.
*H02K 1/28* (2006.01)
(52) U.S. Cl.
USPC ............ 310/156.21; 310/156.26; 310/156.38; 310/44
(58) Field of Classification Search
CPC .................................................. H02K 1/2786
See application file for complete search history.

(56) References Cited

U.S. PATENT DOCUMENTS

| 4,791,328 A | 12/1988 | Lakin .............................. 310/42 |
| 6,674,204 B1 | 1/2004 | Horng et al. ............. 310/156.12 |
| 6,863,839 B2 * | 3/2005 | Yoshizawa et al. ........ 252/62.54 |
| 6,900,559 B2 * | 5/2005 | Aizawa et al. .................. 310/45 |
| 6,944,929 B2 * | 9/2005 | Ogawa et al. .................... 29/458 |
| 7,075,203 B2 | 7/2006 | Kuwert et al. ........... 310/156.13 |
| 7,495,362 B2 | 2/2009 | Tung et al. ............... 310/156.26 |
| 7,649,293 B2 | 1/2010 | Maldener et al. ........ 310/156.22 |

(Continued)

FOREIGN PATENT DOCUMENTS

| DE | 100 51 239 A | 4/2002 |
| DE | 10 2005 043893 A | 5/2006 |

(Continued)

*Primary Examiner* — Burton Mullins
*Assistant Examiner* — Eric Johnson
(74) *Attorney, Agent, or Firm* — Milton Oliver, Esq.; Oliver Intellectual Property LLC

(57) ABSTRACT

An electric motor (20) has a stator (30) and a rotor (26). The latter is equipped with a cup-like rotor part (56) and with a ring magnet (60) adhesively bonded therein, which magnet has an outer circumference (61) on which are provided elevations (84) and depressions (86) that extend at least partly in the longitudinal direction of the ring magnet (60). The outer circumference (61) of the ring magnet (60), that faces toward the cup-like rotor part (56) after assembly, is formed with at least one opening or channel (68; 69, 88), extending in a circumferential direction, that is connected to at least a plurality of the flat depressions (86). Positive mechanical engagement between adhesive and ring magnet enhances durability, and discourages any tendency toward relative rotation between the magnet (60) and the cup-like rotor part (56).

15 Claims, 14 Drawing Sheets

(56) References Cited

U.S. PATENT DOCUMENTS

| | | | |
|---|---|---|---|
| 7,780,422 B2* | 8/2010 | Berroth | 417/420 |
| 2006/0054484 A1 | 3/2006 | Uleski et al. | 200/341 |
| 2006/0055266 A1* | 3/2006 | Iwami et al. | 310/156.47 |
| 2006/0158054 A1* | 7/2006 | Akabane | 310/154.08 |
| 2006/0255677 A1* | 11/2006 | Takehara et al. | 310/156.43 |
| 2007/0013242 A1 | 1/2007 | Tung et al. | 310/67 R |

FOREIGN PATENT DOCUMENTS

| | | |
|---|---|---|
| JP | 60-190153 | 9/1985 |
| JP | 02-007841 | 1/1990 |
| WO | WO 2005-008861 A | 1/2005 |

* cited by examiner

ELECTRIC MOTOR WITH ADHESIVELY BONDED RING MAGNET

CROSS-REFERENCES

This application is a section 371 of PCT/EP09/05941, filed 21 Jul. 2008 and published 7 May 2009 as WO-2009-056180-A3, whose priority document is German application DE 10 2007 054 322.2, filed 31 Oct. 2007, the entire content of which is hereby incorporated by reference.

FIELD OF THE INVENTION

The invention relates to an electric motor having a stator and having a rotor, in which latter is mounted a cup-like yoke. A ring magnet of the rotor is adhesively bonded into said yoke.

BACKGROUND

Such ring magnets can be manufactured in various ways, for example from a rubber-like material into which hard-ferromagnetic particles are embedded. This rubber-like material is then mounted in a yoke of this kind. Such ring magnets are also referred to as "rubber magnets."

There are also ring magnets that are manufactured by injection molding from a raw granulated plastic, for example from SmFeN with a polyamide "PA 12" matrix, and, in this case, a slip agent that contains silicone molecules is often added to the raw granulate. Such ring magnets are referred to hereinafter as "plastic-matrix ring magnets."

With this type of plastic-matrix ring magnet having added silicone, adhesive bonding is not reliable in processing terms, i.e. the adhesive compound cross-links with the yoke, but as a result of contaminants such as, for example silicone residues,
release agents,
oils,
fats, etc.

that are present on the side of the plastic-matrix ring magnet that is to be adhesively bonded, insufficient cross-linking, of the adhesive compound with the ring magnet at that location, is possible in some circumstances, and the risk therefore exists that the relative position of the ring magnet and rotor housing may change in the context of further process steps, e.g. under thermal or mechanical loads.

For this reason, laborious cleaning processes are necessary prior to adhesive bonding in order to increase process reliability. In addition, such cleaning processes clean the surface that is to be bonded only for a certain time. Subsequent diffusion of silicone molecules degrade adhesion capability not only directly prior to bonding, but also during the time when the adhesive compound is curing.

Thus, whereas the adhesive compound reliably cross-links with the yoke, such cross-linking on the surface of a plastic-matrix ring magnet of this kind is not possible in every case to a sufficient extent, as a result of the aforementioned contaminants.

SUMMARY OF THE INVENTION

An object of the invention is therefore to make available a novel electric motor.

According to the invention, this object is achieved by providing a central stator, an external rotor constituted by a cuplike rotor part with an inner surface and a ring magnet adhesively bonded therein, the outer circumference of the ring magnet being formed with alternating longitudinal elevations and depressions, the rotor part and the ring magnet defining, between them, an annular void which interconnects at least a plurality of the flat depressions. The void helps distribute adhesive. Greater process reliability is obtained thereby. The low adhesion forces with respect to the plastic-matrix ring magnet that can occasionally occur, for the reasons mentioned, are compensated for by the mechanical positive engagements (gear-like engagements, undercuts, etc.). Entirely satisfactory process reliability is obtained, as well as a normal service life for the electric motor. Failure of the adhesive bond appears to be ruled out.

Further details and advantageous refinements of the invention are evident from the exemplifying embodiments, in no way to be understood as a limitation of the invention, that are described below and depicted in the drawings, in which:

BRIEF FIGURE DESCRIPTION

FIG. 1 is an exploded view of an exemplifying embodiment of an electric motor;

FIG. 2 is a greatly enlarged three-dimensional depiction of a first embodiment of a ring magnet 60 that is equipped on its external circumferential surface 61 with flat, relief-like elevations and depressions, and also with an annular groove 88 in the circumferential direction;

Identical or identically functioning parts are usually labeled hereinafter with the same reference characters, and are described only once. Terms such as "left," "right," "top," "bottom" refer to the particular figure.

DETAILED DESCRIPTION OF PREFERRED EMBODIMENTS

Figure 1:
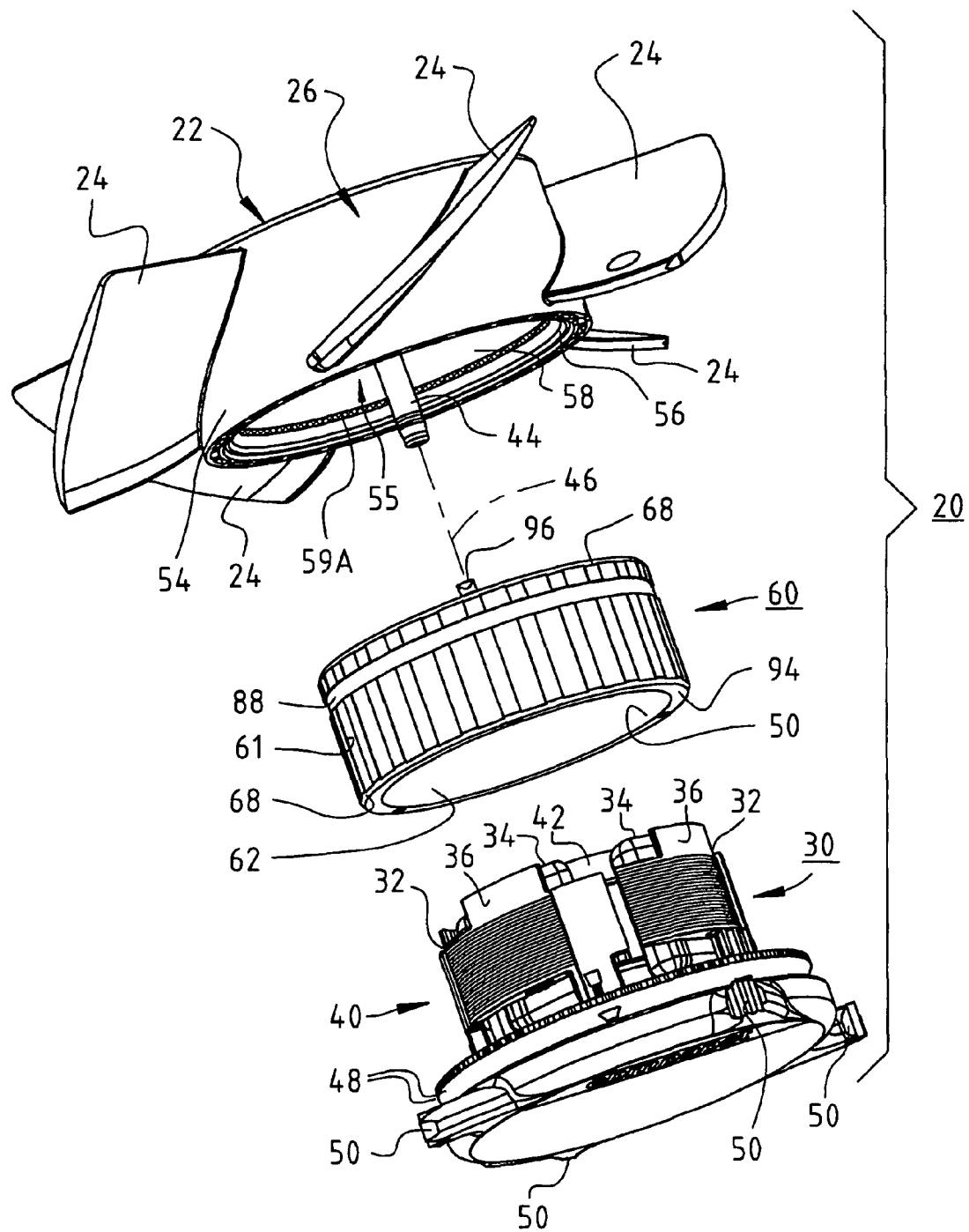

FIG. 1 is an exploded view of an external-rotor motor 20 that serves here, by way of example, to drive a fan wheel 22 that is depicted with five fan blades 24 that are mounted on an external rotor 26.

Located in the interior of external rotor 26 is an internal stator 30 of usual construction, here having four stator poles 32 that are wound with a stator winding arrangement 34. Stator poles 32 are depicted, by way of example, as salient poles. The coil formers are labeled 36.

Figure 6:
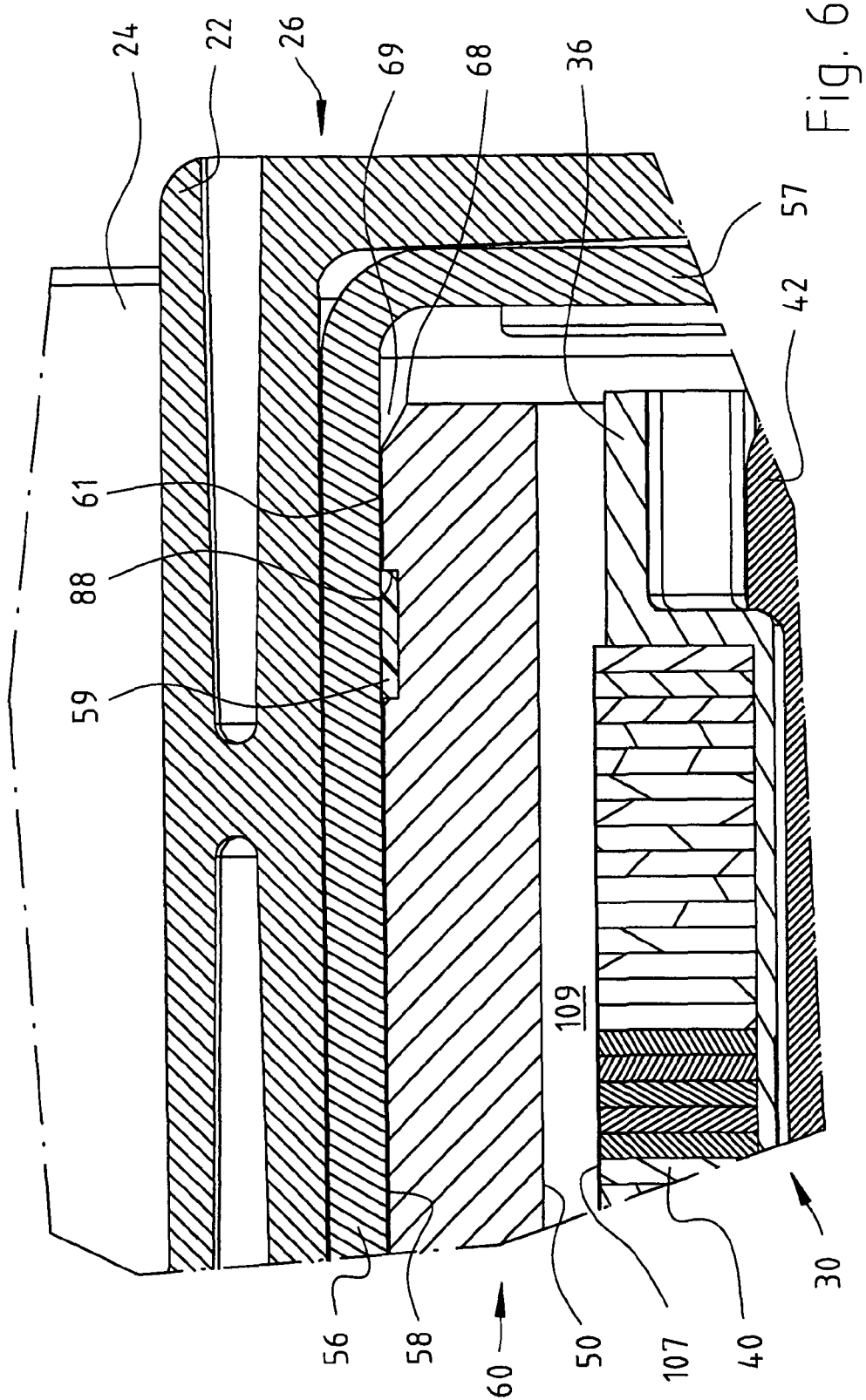
FIG. 6 is a depiction, analogous to FIG. 5, in which rotor 26 is installed on stator 30.

Stator poles 32 are part of a lamination stack 40 that is usually pressed onto a bearing tube 42 and is partly visible in FIG. 6. Located in it are bearings (not depicted), for example plain bearings or ball bearings, for journaling a rotor shaft 44.

In FIG. 1, the location of the rotation axis of external rotor 26 is labeled 46 and is indicated with dot-dash lines.

Bearing tube 42 is mounted on a support flange 48 that is in turn connected, by means of struts 50 (which are merely indicated in FIG. 1) to an air-guiding housing (not depicted) which surrounds fan blades 24 with a small spacing. Such fans are often used as equipment fans, e.g. in order to cool computers.

External rotor 26 is implemented approximately in the manner of a can or a bell. The can is usually manufactured on its outer side from a suitable plastic 54, and is immovably connected on its interior to a can or cup 56, made of a magnetically conductive material, that has an open side 55 (FIG. 1) on whose base 57 shaft 44 is mounted, and whose inner side is labeled 58. Cup 56 serves as a magnetic yoke for a hollow-cylindrical permanent magnet 60.

Figure 4:
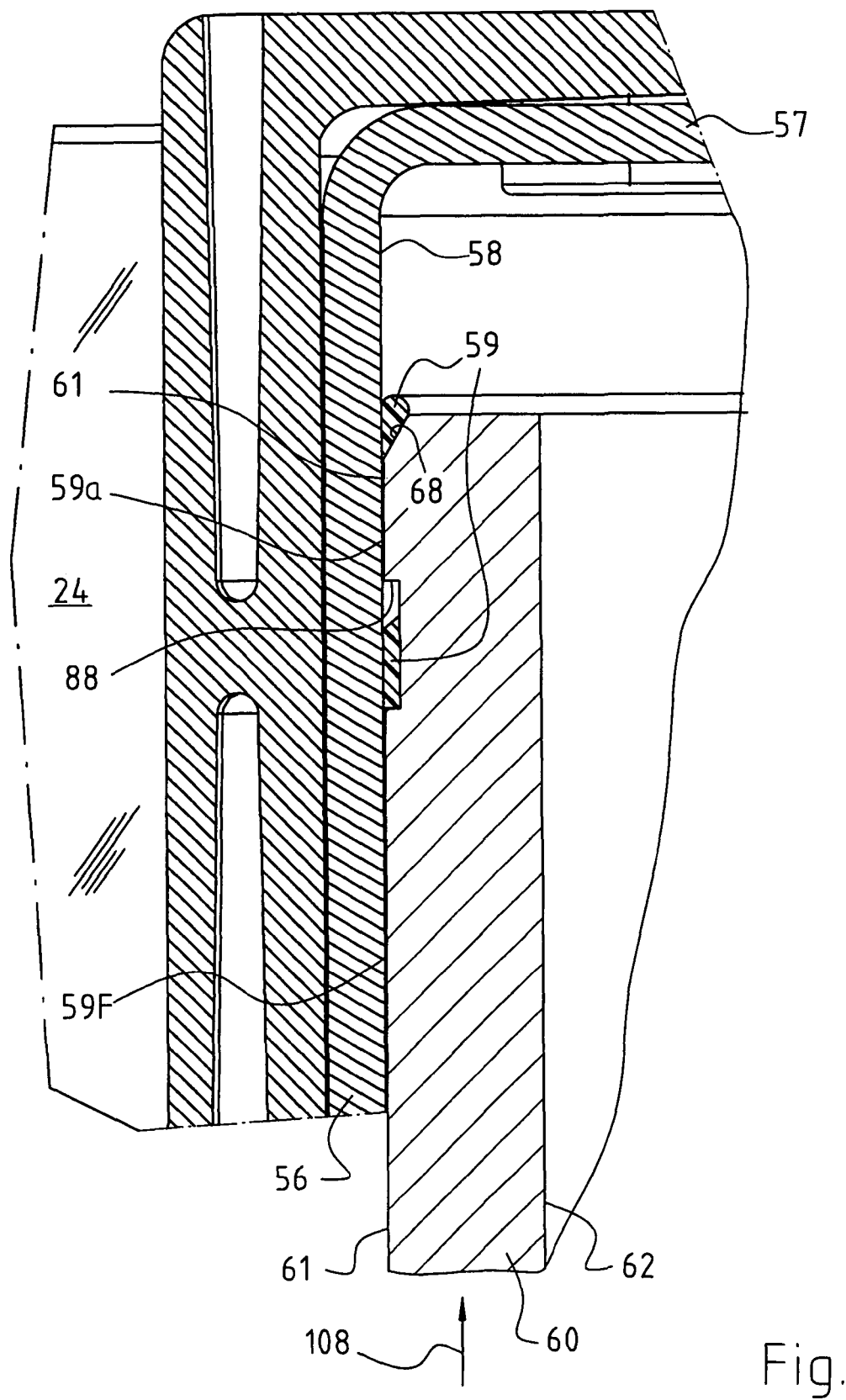
FIG. 4 is a first drawing to explain the installation of ring magnet 60 in a yoke 56, 57 of the rotor.

Said permanent magnet 60 is adhesively bonded, with its outer side 61, into said inner side 58 by means of a suitable adhesive compound 59 (FIG. 4). Depending on requirements (e.g. environmental conditions, magnetic values, production technology, metering, curing method), a variety of adhesive types can be used:

Anaerobic adhesives: advantages are, for example, a small adhesive gap, i.e. the volume of ring magnet 60 is maximized.

Epoxy resin adhesives having one or two components. The advantage is that high utilization temperatures are possible in this case.

Polyurethane adhesives. The advantage is that they are viscoplastic and can therefore compensate particularly effectively for differing thermal expansion values of the materials to be bonded.

Examples of Adhesives

| Anaerobic adhesives: | Henkel: | Loctite 510, Loctite 128500 |
|---|---|---|
| | Delo: | Delo ML adhesives |
| Epoxy resin adhesives: | Henkel: | Loctite 95xx series |
| | Delo: | Delo Monopox adhesives |
| | | Delo Duopox adhesives |
| Polyurethane adhesives: | Henkel: | Macroplast adhesives |
| | Delo: | Delo PUR adhesives |

The hollow-cylindrical inner side of permanent magnet 60 delimits the magnetically effective air gap 109 (FIG. 6) of motor 20 toward the outside, while stator poles 32 delimit air gap 109 toward the inside.

Figure 2:
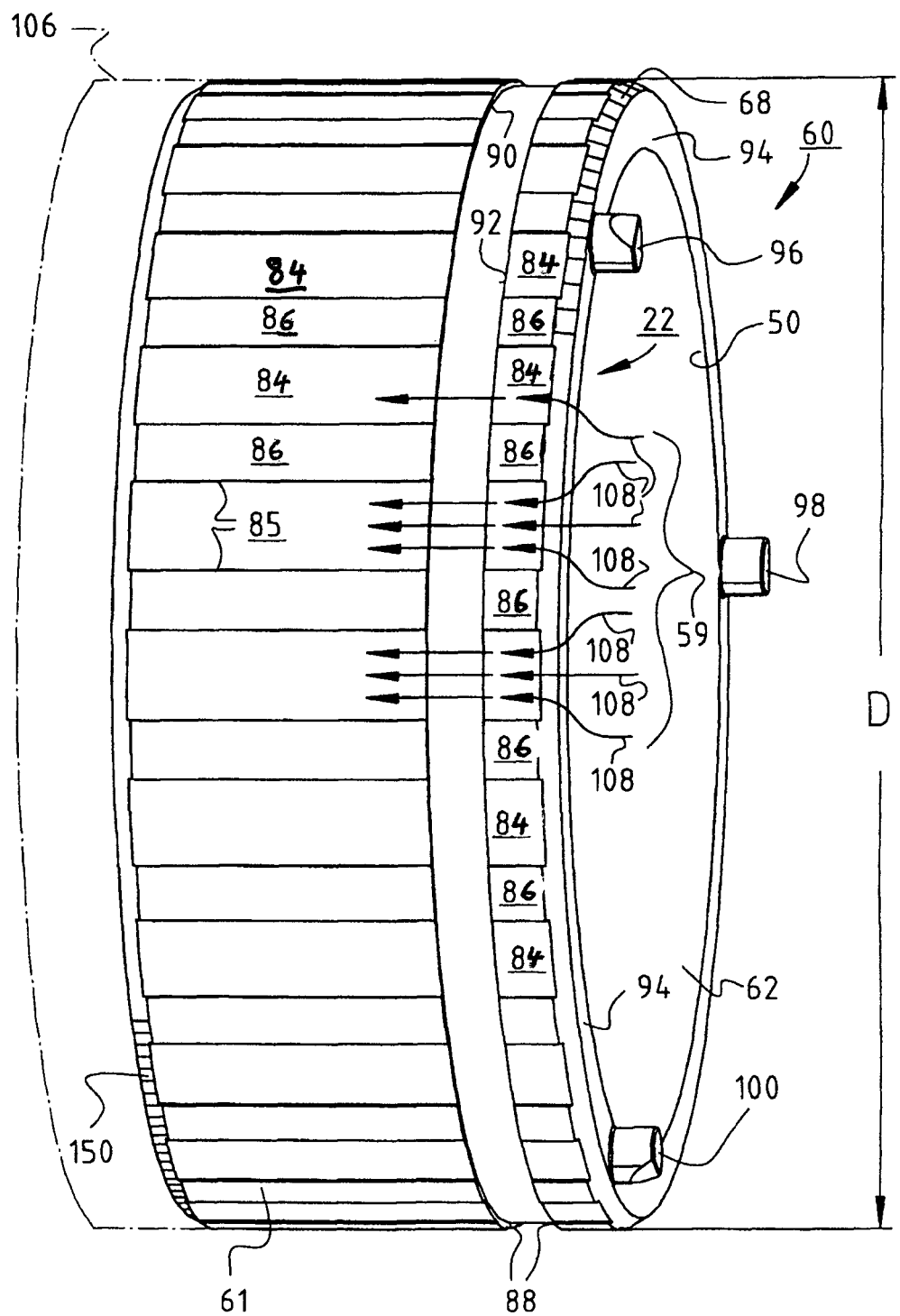
Figure 3:
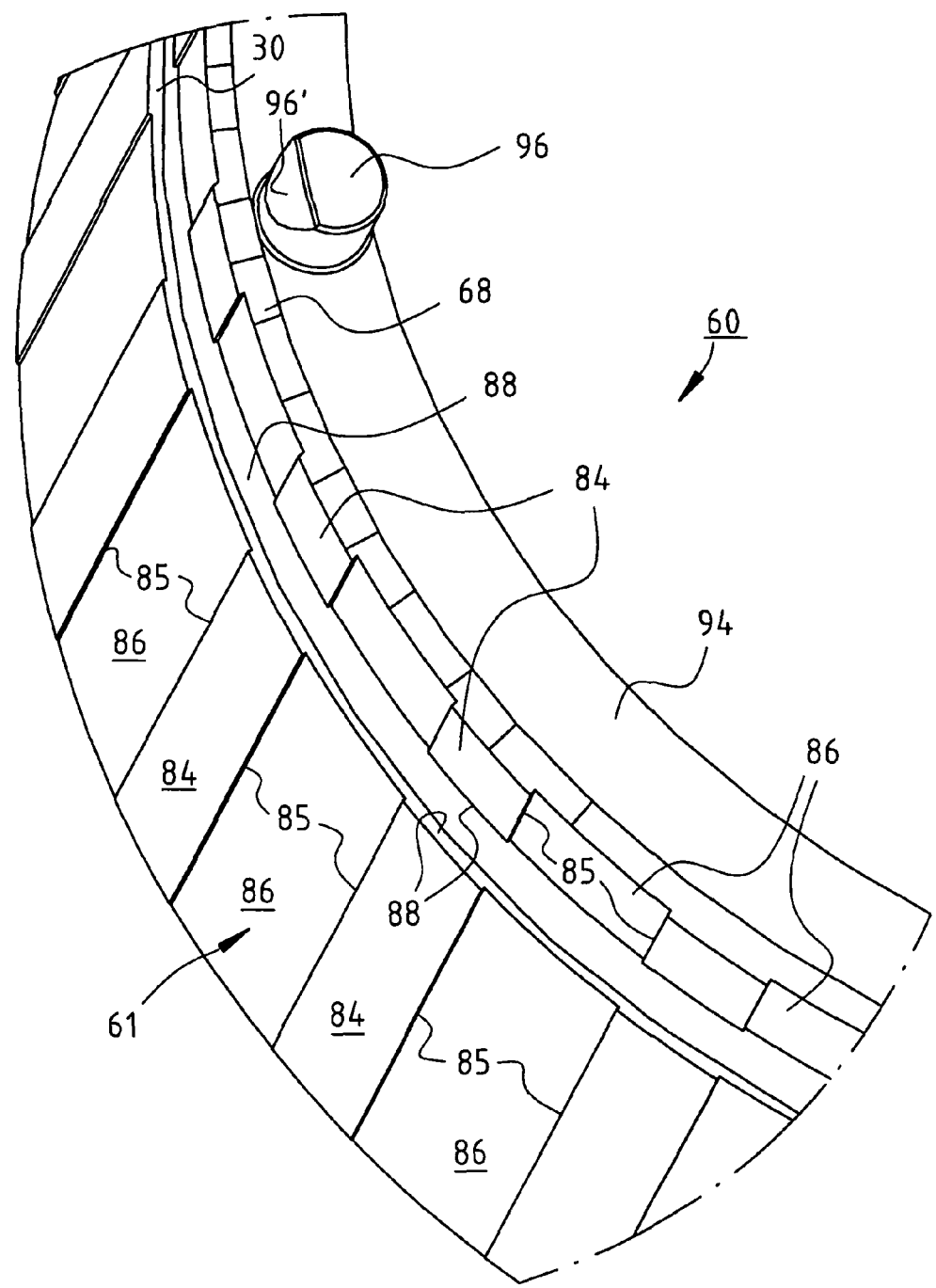
FIG. 3 shows an enlarged detail of ring magnet 60 of FIG. 2.

FIG. 2 and FIG. 3 show ring magnet 60 of FIG. 1 in an enlarged, three-dimensional view. Its diameter D is in most cases between 20 and 40 mm, i.e. the drawing is greatly enlarged so that details can be depicted.

Outer side 61 of ring magnet 60 is equipped with flat elevations (here in the form of longitudinal ribs 84) and with flat depressions (here in the form of longitudinal grooves 86) which, as depicted, extend in such a way that upon insertion of ring magnet 60 into yoke ring 56, and upon metering of the adhesive onto the inner wall of cup 56, adhesive compound 59 can flow into longitudinal grooves 86 (adhesive metered onto the inner wall of cup 56).

Ring magnet 60 furthermore has a flat annular groove 88 that in this case is somewhat deeper than longitudinal grooves 86. The adhesive fills annular groove 88 during insertion, and in the insertion direction it fills longitudinal grooves 86 located thereabove. The depth of longitudinal grooves 86 is on average less than 1 mm, and preferably less than 0.5 mm. To summarize, one might say that the outer circumference 61 of ring magnet 60 is provided with flat depressions 86, 88 in the manner of a gravure printing roller.

Alternatively, the adhesive can also be metered into annular groove 88. If the adhesive is metered onto ring magnet 60, i.e. preferably into annular groove 88, the adhesive is then distributed into longitudinal grooves 86 during the insertion of magnet 60 into cup 56.

In this example annular groove 88 forms, on both sides, shoulders 90 and 92, respectively, that serve for positive connection with adhesive compound 59 after it has cured. In the same fashion, the steep transitions 85 between longitudinal ribs 84 and longitudinal grooves 86 serve as shoulders that prevent rotation between ring magnet 60 and the cup-like rotor part 56 (FIG. 1) into which ring magnet 60 is adhesively bonded.

On its right (in FIG. 2) end face 94, ring magnet 60 has three axially protruding pegs 96, 98, 100 that serve as spacers 57 during assembly and during the curing of adhesive compound 59, and thereby establish the axial position of ring magnet 60 relative to rotor part 56. As depicted in FIGS. 1 to 3, they can have oblique surfaces 96', 98', 100' on their radial outer sides.

Ring magnet 60 is also equipped, in the region of this end face 94, with oblique surface 68, which in this example has approximately the shape of a truncated cone and constitutes a transition from end face 94 to the flat longitudinal grooves 86. This promotes the distribution of adhesive on ring magnet 60 during insertion.

Upon assembly, ring magnet 60, which can preferably be manufactured from a suitable raw granulate (plastic grains having embedded hard ferrite particles) by injection molding and whose outer side 61 is implemented in the manner described, is adhesively bonded by means of adhesive compound 59 into inner side or surface 58 of the cup-like rotor part 56. Because the latter is usually manufactured from soft iron, adhesive bonding does not represent a problem in terms of rotor part 56, since strong adhesive forces occur there as a result of the adhesion process at the interface between adhesive compound 59 and rotor part 56.

The situation is different for injection-molded plastic-matrix ring magnets 60, since they can contain slip agents in the form of silicone molecules that can be removed, at best temporarily, by the usual cleaning methods.

The surface structure, as described and depicted, of ring magnet 60 eliminates the risk that the latter will detach over time from rotor part 56, since adhesive compound 59, which cures in the context of the adhesive bonding process, forms positively engaging connections in particular with depressions 86 of said relief-like surface structure 61. Adhesive compound 59 flows around elevations 84, which thereby produce additional positively engaging connections and prevent displacement and/or rotation of ring magnet 60, even if the adhesive forces on its surface 61 sometimes happen to be very low. A favorable shape for the magnetic circuit in rotor 26 also results.

This secure connection is therefore produced, on the one hand, by the adhesive forces of adhesive compound 59 at the interface with rotor part 56 and, on the other hand, by the cohesive forces between the molecules in adhesive layer 59. The low adhesive forces at the interface with a plastic-matrix ring magnet 60 consequently cannot lead to failure of the adhesive bond.

The above-described relief-like implementation of outer side 61 of ring magnet 60 thus yields, without additional cost, a substantial enhancement in the process reliability and service life of such motors, without thereby impairing their properties.

Figure 5:
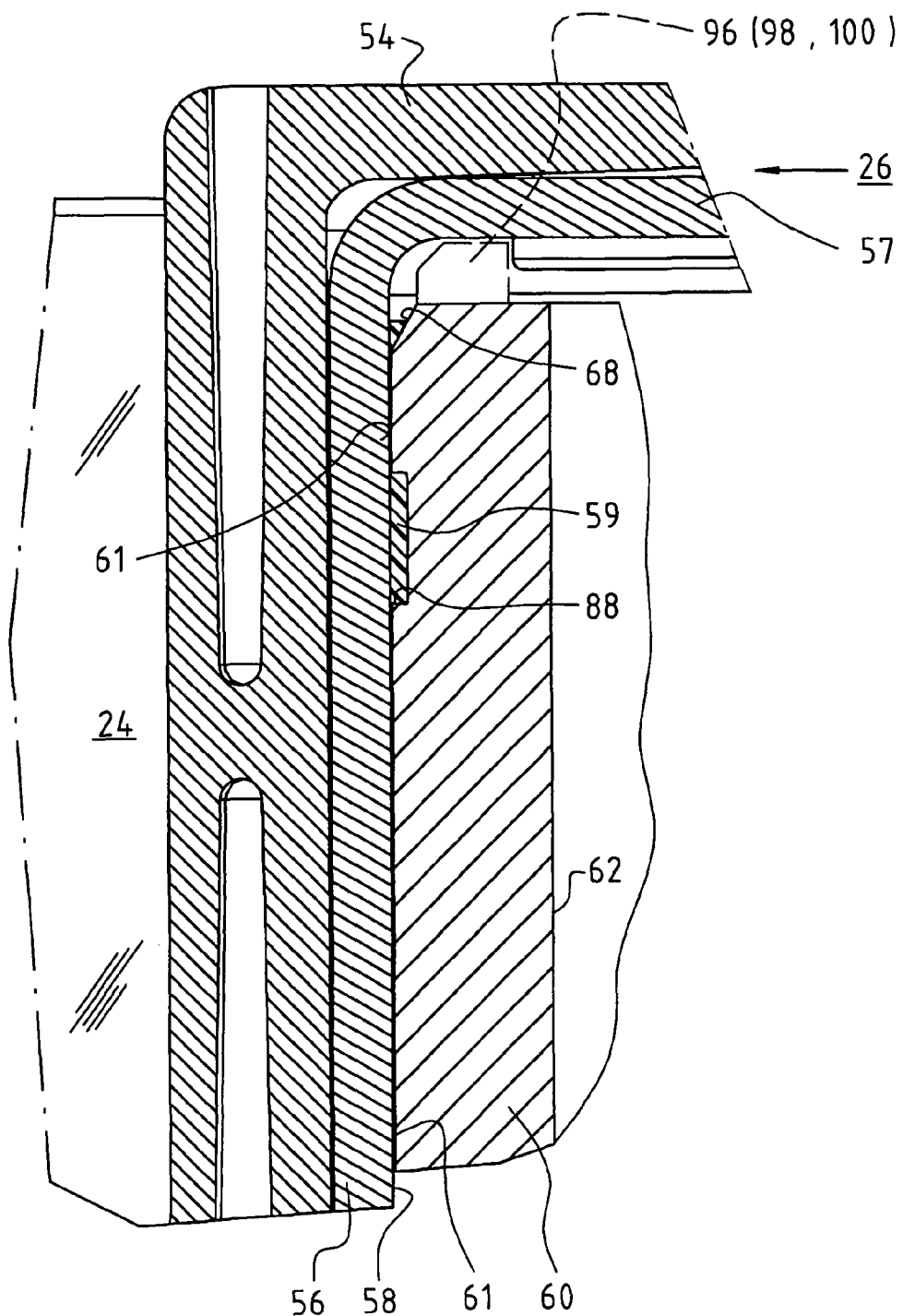
FIG. 5 is a second drawing, analogous to FIG. 4, in which ring magnet 60 is inserted completely into yoke 56, 57.

As shown by FIG. 4, FIG. 5, and FIG. 6, ring magnet 60 has, at its end region facing toward base 57 and on its radially outer side 61 there, its oblique surface 68 that forms, together with rotor part 56, a void 69 (FIG. 6) of approximately triangular cross section. In the embodiment according to FIGS. 1 to 6, this oblique surface 68 is formed by frustoconical surface segment 68 (see FIGS. 2 to 6). This segment 68 has advantages, in the context of the adhesive bonding of ring magnet 60 into rotor part 56, as will be explained below. As FIGS. 4 to 6 show, the radial spacing, between oblique surface 68 and inner surface 58, decreases in the direction away from base 57.

According to FIGS. 2 and 3, frustoconical segment 68 intersects the flat longitudinal grooves 86 and flat longitudinal ribs 84, so that adhesive compound 59 can flow out of said segment into flat longitudinal grooves 86 and through them also into annular groove 88. In this context, a film 59F (FIG. 4) of adhesive compound forms on the flat longitudinal ribs 84; this film should, however, be thin, since it acts in rotor 26 as a magnetic air gap and therefore might slightly attenuate the magnetic flux generated by ring magnet 60 in air gap 109 (FIG. 6).

Installing Ring Magnet 60 in Rotor Part 58

In one method, a bead 59A of adhesive compound 59 is applied, prior to assembly, in the region of open end 55 of rotor can 56 on its inner side or surface 58, as depicted in FIG. 1.

An adhesive metering device such as the one usually utilized in industrial adhesive bonding for application of the adhesive, which device enables application of a defined quantity of adhesive 59 in the form of said bead 59a, is used for application. Said bead is preferably free of interruptions, i.e. is continuous. The necessary quantity of adhesive is ascertained beforehand, for example by means of experiments.

Ring magnet 60 is then inserted from below (referring to FIG. 1) into inner side 58 of rotor can 56, such that frustoconical surface 68 abuts against bead 59A and displaces it upward, as schematically depicted in FIG. 4 and FIG. 5.

As indicated schematically and by way of example with arrows 108 at the center of FIG. 2, adhesive compound 59 is distributed in this context by longitudinal ribs 84 in the manner of a spreader, and flows in largely identical quantities into the individual flat longitudinal channels 86 and from there to annular groove 88.

There the flat longitudinal ribs 84 once again produce a distribution of the adhesive compound, so that upon insertion of ring magnet 60 it flows—still uniformly distributed over outer side 61—into the lower region of the flat channels 86 and likewise fills them up.

FIG. 4 shows the process of introduction in the direction of an arrow 108. Adhesive compound 59, which initially is located at the top in the annular opening 68, travels into the flat openings 86, 88 and from annular groove 88 further into the flat longitudinal grooves 86 in the lower part of ring magnet 60. Longitudinal grooves 86 and annular groove 88 are, in this fashion, filled with adhesive compound 59 as a result of the longitudinal displacement of ring magnet 60 in the direction of arrow 108.

FIG. 5 shows how, at the end of the longitudinal displacement, ring magnet 60 abuts with its pegs 96, 98, 100 against base 57 of can 56, thereby completing assembly. Annular groove 88 is thereby largely filled with adhesive compound 59, likewise the longitudinal grooves 86 (not depicted), while annular channel 68 contains either no further adhesive compound 59 at all, or only small residues. This reduces imbalances and facilitates further processing, since adhesive compound 59 can cure quickly and is distributed very uniformly on outer side 61 of ring magnet 60. The latter is thus also, during assembly, simultaneously a tool that produces a uniform distribution of adhesive compound 59 on its own outer circumference 61; as a result of the engagement of the cured adhesive compound 59 into the flat longitudinal grooves 86 and into annular groove 88, a secure, positively engaged attachment of ring magnet 60 is produced, even if its outer side 61 happens to be contaminated with traces of silicone or the like.

Once adhesive compound 59 has cured, rotor 26 is mated to stator 30 (see FIG. 6), in which context shaft 44 (FIG. 1) mounted on base 57, which shaft is not depicted in FIG. 6, is inserted e.g. into plain bearings or rolling bearings (not depicted) in bearing tube 42. A magnetically effective air gap 109 (see FIG. 6) is produced in this context between outer circumference 107 of stator lamination stack 40 and inner side 50 of ring magnet 60. Ring magnet 60 can be radially magnetized, which is not depicted.

As an alternative, with the version of ring magnet 60 according to FIGS. 1 to 6, adhesive 59 can also be metered in the requisite quantity into circumferential groove 88 before ring magnet 60 is inserted into cup 56.

In this case, the excess adhesive 59 is pressed in both directions into the flat longitudinal grooves 86. Adhesive that emerges at the top from longitudinal grooves 86 travels first to oblique surface 68 (see FIGS. 4 and 5) and is then transported back down into the flat longitudinal grooves 86 by the continuing motion of ring magnet 60 in the direction of arrow 108 of FIG. 4. The advantage is that it is particularly easy to monitor whether groove 88 has been completely filled with adhesive 59 in the context of metering. This is especially important because laborious balancing operations might otherwise be necessary.

Many variations, such as those explained below with reference to FIGS. 7 to 14, are of course possible within the scope of the invention. In this context, the same reference characters as those in FIGS. 1 to 6 are used for identical or identically functioning parts. The motor (FIG. 1) is not depicted again, since it can be unchanged except for the external shape of ring magnet 60.

Figure 7:
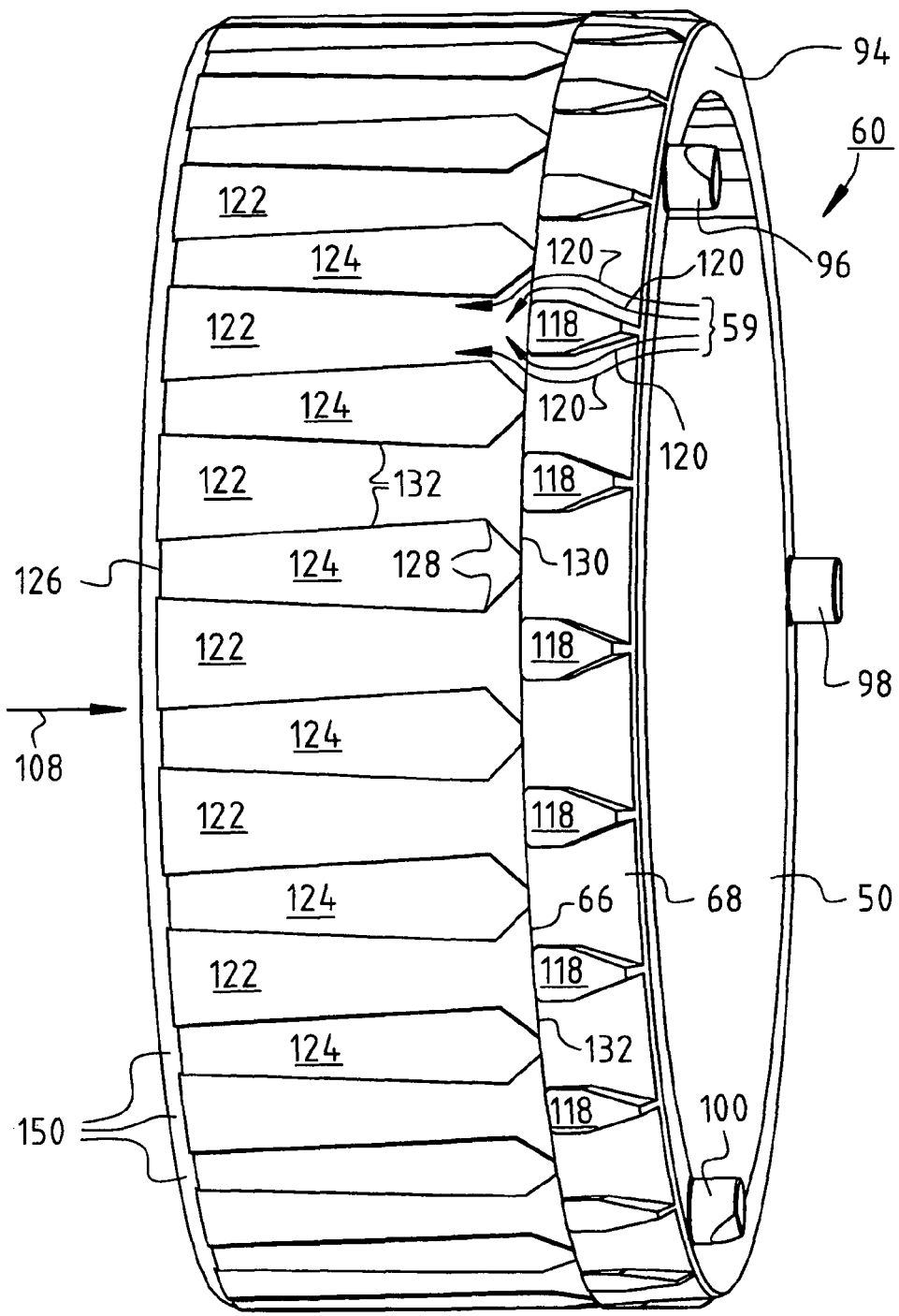
FIG. 7 shows a second embodiment of a ring magnet 60 that is equipped with relief-like elevations and depressions.

FIG. 7 shows a variant in which, just as with ring magnet 60 of FIG. 2, the right end of ring magnet 60 is implemented, up to a boundary 66, in the form of a truncated cone 68, while the left part has a substantially cylindrical profile. Provided on truncated cone 68 are flow dividers 118 which, when ring magnet 60 is inserted in the direction of arrow 108 into yoke 56, serve to deflect adhesive compound 59 (from bead 59A) in the manner indicated schematically in FIG. 7 by flow lines 120, and thereby to optimize the distribution of adhesive compound 59 in the adhesive gap (between ring magnet 60 and yoke 56). In this context, adhesive compound 59 is deflected into flat channels 122 that extend in a longitudinal direction between flat elevations 124, as shown by the drawings.

Flat elevations 124 are shaped approximately like traffic arrows, i.e. they extend from a narrow left end 126 toward the right to a widest point 128 and from there taper toward the right to a narrow tip 130, which in this case is located at boundary 66 with truncated cone 68. As indicated symbolically by flow lines 120, adhesive compound 59 is deflected by the relevant flow divider 118 and by elevations 124, and directed to one of the flat depressions 122 between two flat elevations 124 in order to fill up said depressions. The steep edge 132 between elevations 124 and depressions 122 results in a corresponding positively engaged connection in both the longitudinal and the circumferential directions.

This kind of shape of ring magnet 60 is often easier to manufacture by plastic injection molding than the shape according to FIGS. 2 and 3. Its advantage is maximum magnet volume, i.e. good utilization of permanent ring magnet 60.

Figure 8:
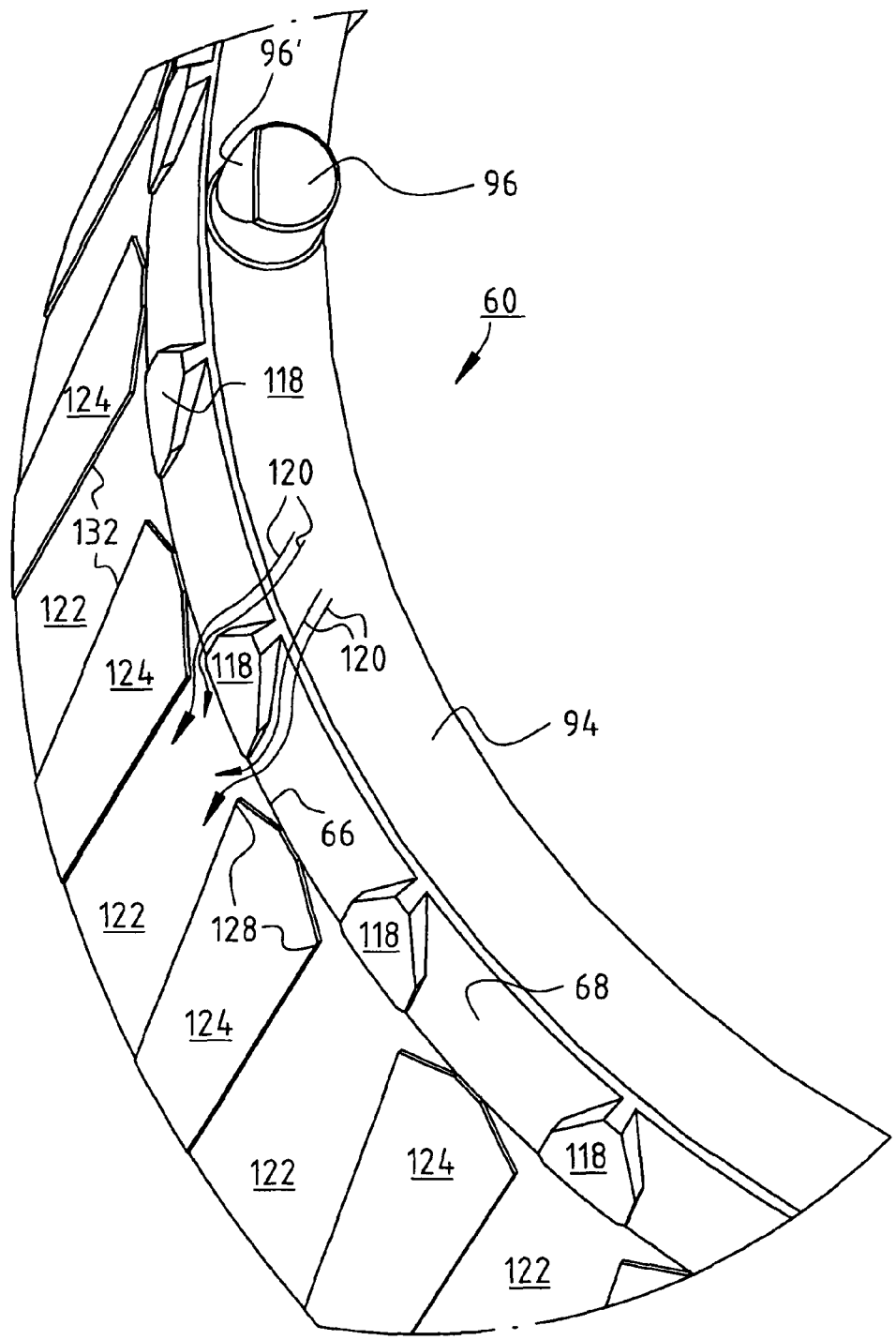
FIG. 8 is an enlargement of a detail of FIG. 7.

FIG. 8 shows an enlarged detail of FIG. 7.

Figure 9:
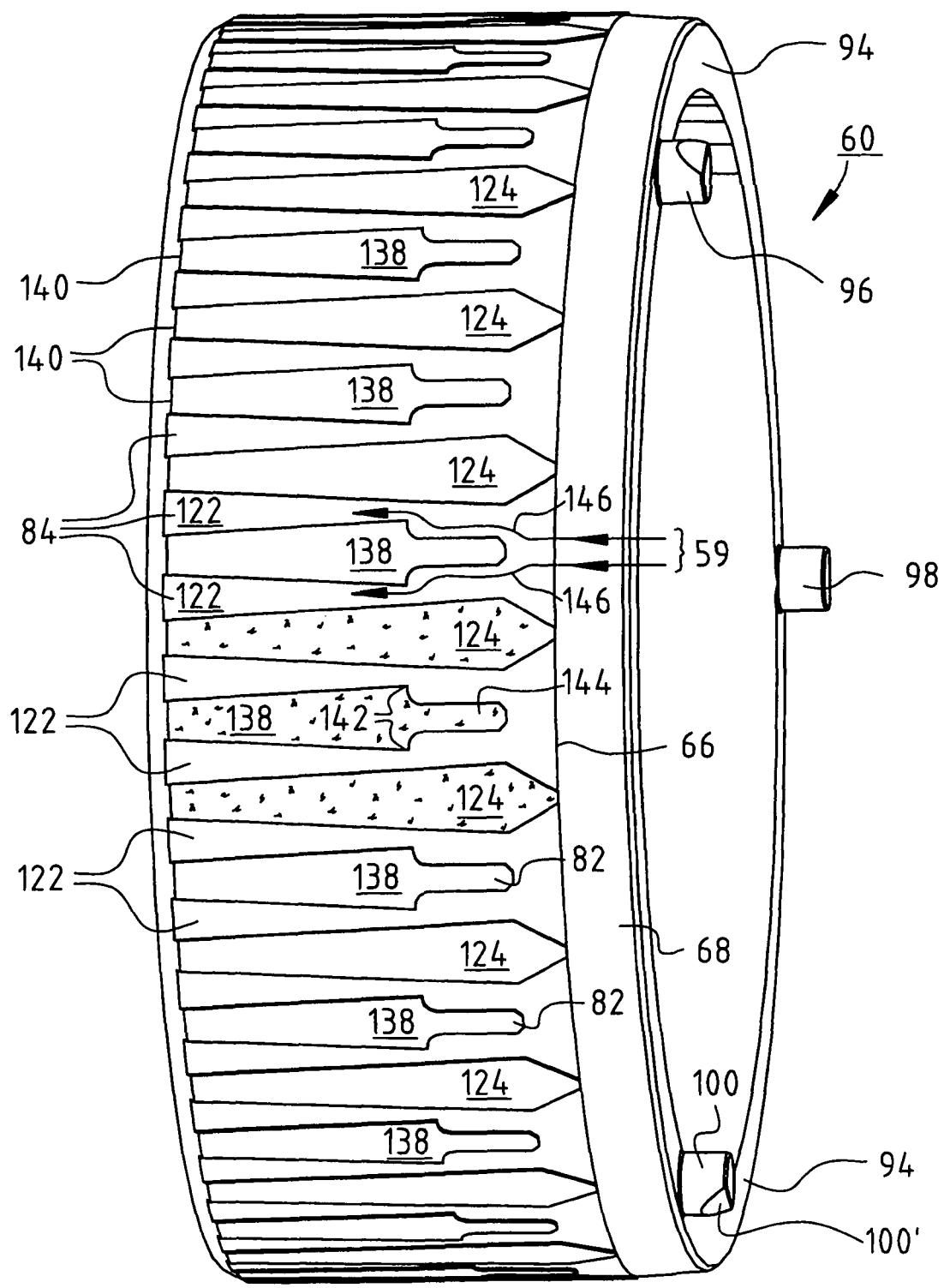
FIG. 9 shows a third embodiment of a ring magnet 60 that is equipped with relief-like elevations and depressions.
Figure 10:
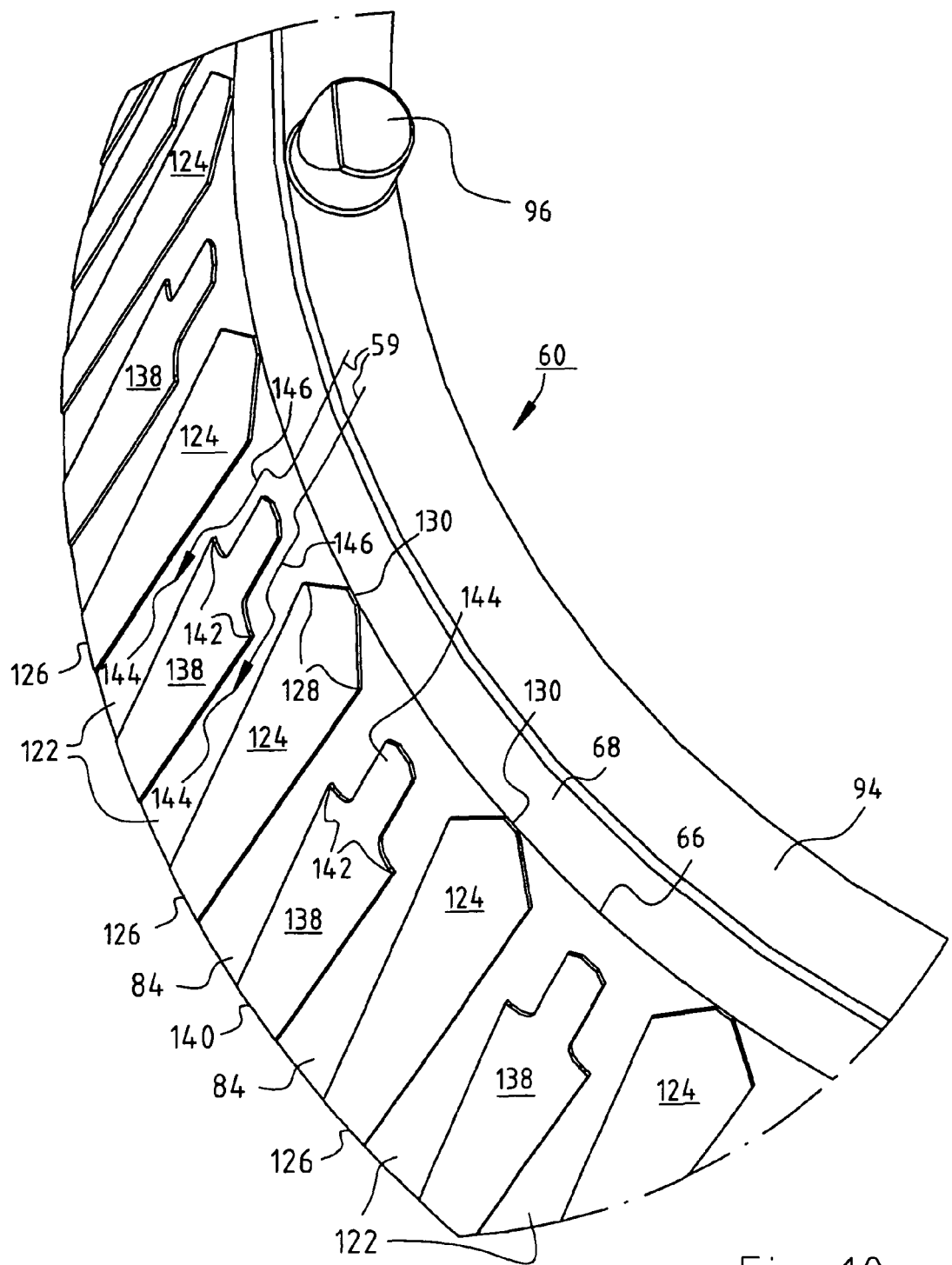
FIG. 10 is an enlargement of a detail of FIG. 9.

FIG. 9 and FIG. 10 show a variant of the embodiment according to FIGS. 7 and 8. Ring magnet 60 according to FIGS. 9 and 10 once again has on the right a frustoconical segment 68 that, however, unlike in FIGS. 7 and 8, is not equipped with flow dividers. Flat elevations 124 have the same shape as in FIGS. 7 and 8, and the reader is therefore referred to that description.

Located in each flat depression 122 between two elevations 124 is a respective flat elevation 138. Proceeding from a short segment 140 at its left end, elevation 138 widens to a point 142 of maximum width. From point 142, its width decreases sharply toward the right down to a narrow, finger-like segment 144 that acts as a flow divider for adhesive 59, as symbolically indicated by flow lines 146.

Figure 11:
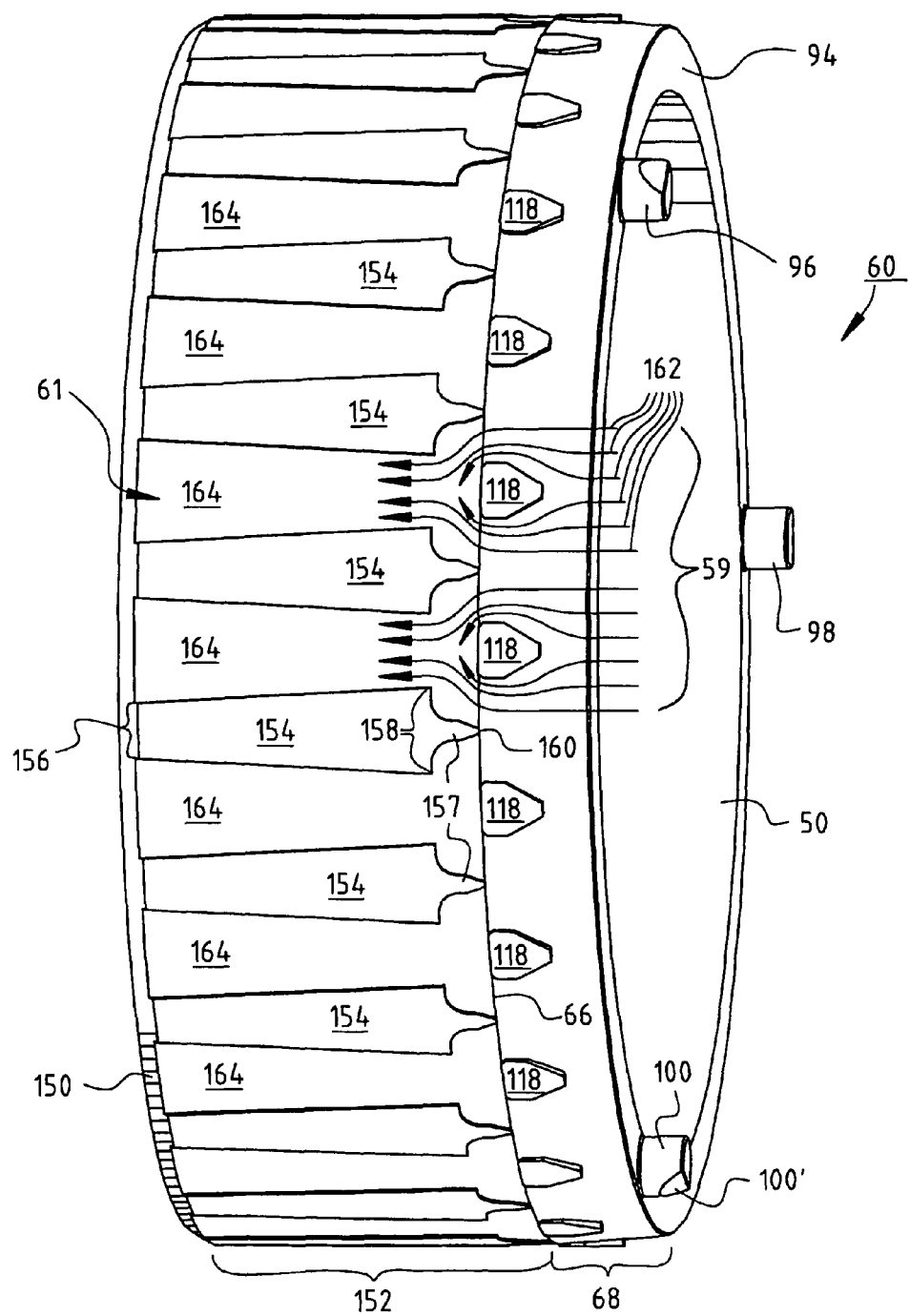
FIG. 11 shows a fourth embodiment of a ring magnet 60 that is equipped with relief-like elevations and depressions.
Figure 12:
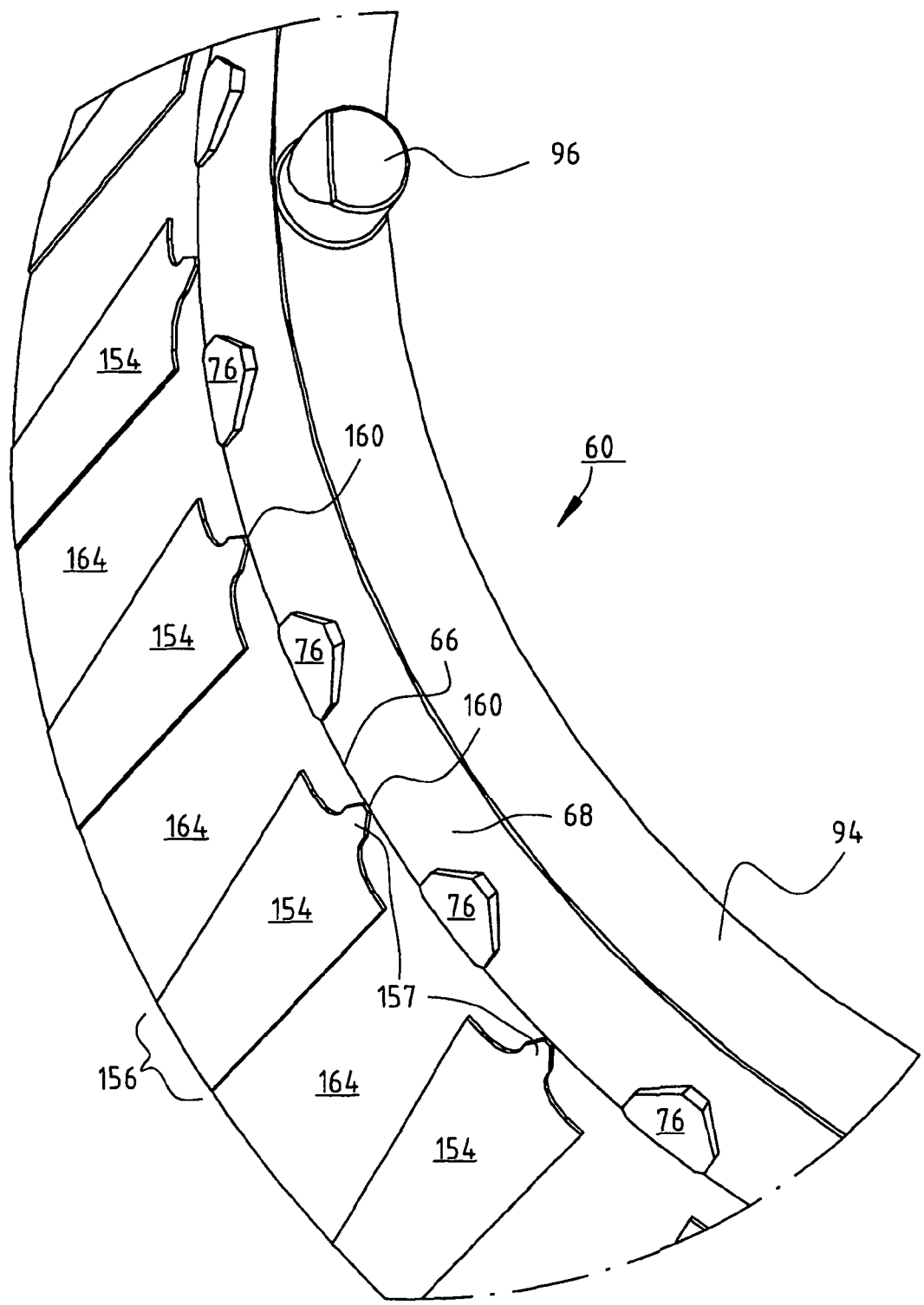
FIG. 12 is an enlargement of a detail of FIG. 11.

FIGS. 11 and 12 show another variant that is put together from elements of FIGS. 7 and 8 and elements of FIGS. 9 and 10.

Ring magnet 60 according to FIGS. 11 and 12 corresponds in its basic structure to the preceding variants, i.e. it has a cylindrical opening 50 on the inside. On the left if has on its outer side 61 firstly a short frustoconical segment 150, then a segment 152 that is substantially cylindrical and extends approximately to a boundary 66, and to the right of that a frustoconical segment 68 that tapers to the right and ends at end face 94. Also adjacent to this, to the right, are spacing members 96, 98, 100, whose function has already been described.

Located on frustoconical segment 68 are flow dividers 118 that, unlike in FIG. 8, are shorter than segment 68 but otherwise have the same configuration as flow dividers 118 of FIGS. 7 and 8. Here as well, their function is to distribute adhesive compound 59 from bead 59A uniformly on ring magnet 60. The structure of flow dividers 118 is clearly evident to the skilled artisan from the drawings, and they extend radially outward approximately as far as enveloping cylinder 106 that is depicted in FIG. 2, so that adhesive compound 59 is forced to flow past a flow divider 118 on both of its sides, thereby producing effective flow division.

Located on cylindrical segment 152 are elongated flat elevations 154 that correspond approximately, in terms of their shape and function, to elevations 138 according to FIGS. 9 and 10.

Elevations 154 begin at the left at a narrow region 156 and widen from there toward the right to a widest point 158. Their width then decreases to the right very sharply, down to a narrow segment 157. All the way on the right they have a substantially sharp point 160 that coincides approximately with boundary 66.

FIG. 11 schematically shows flow lines 162 of adhesive 59. These are divided once by flow dividers 118, and on the other hand by segments 157 and their right-hand tips 160, so that approximately the same amount of adhesive compound 59 flows into all the flat depressions 164 (between flat elevations 154). The result is that a secure join is obtained even if silicone residues or the like remain on outer side 61 of ring magnet 60.

Figure 13:
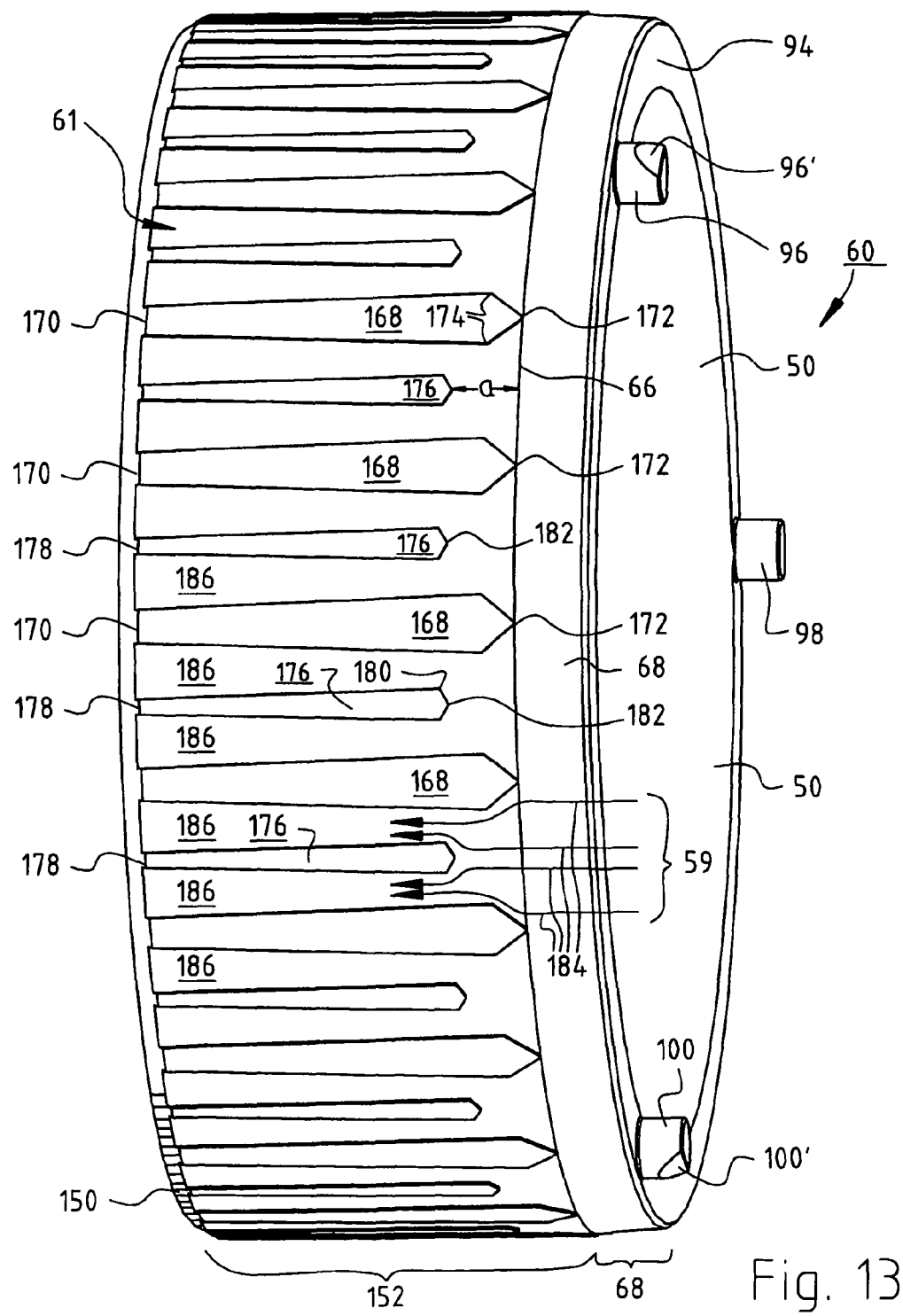
FIG. 13 shows a fifth embodiment of a ring magnet 60 that is equipped with relief-like elevations and depressions.
Figure 14:
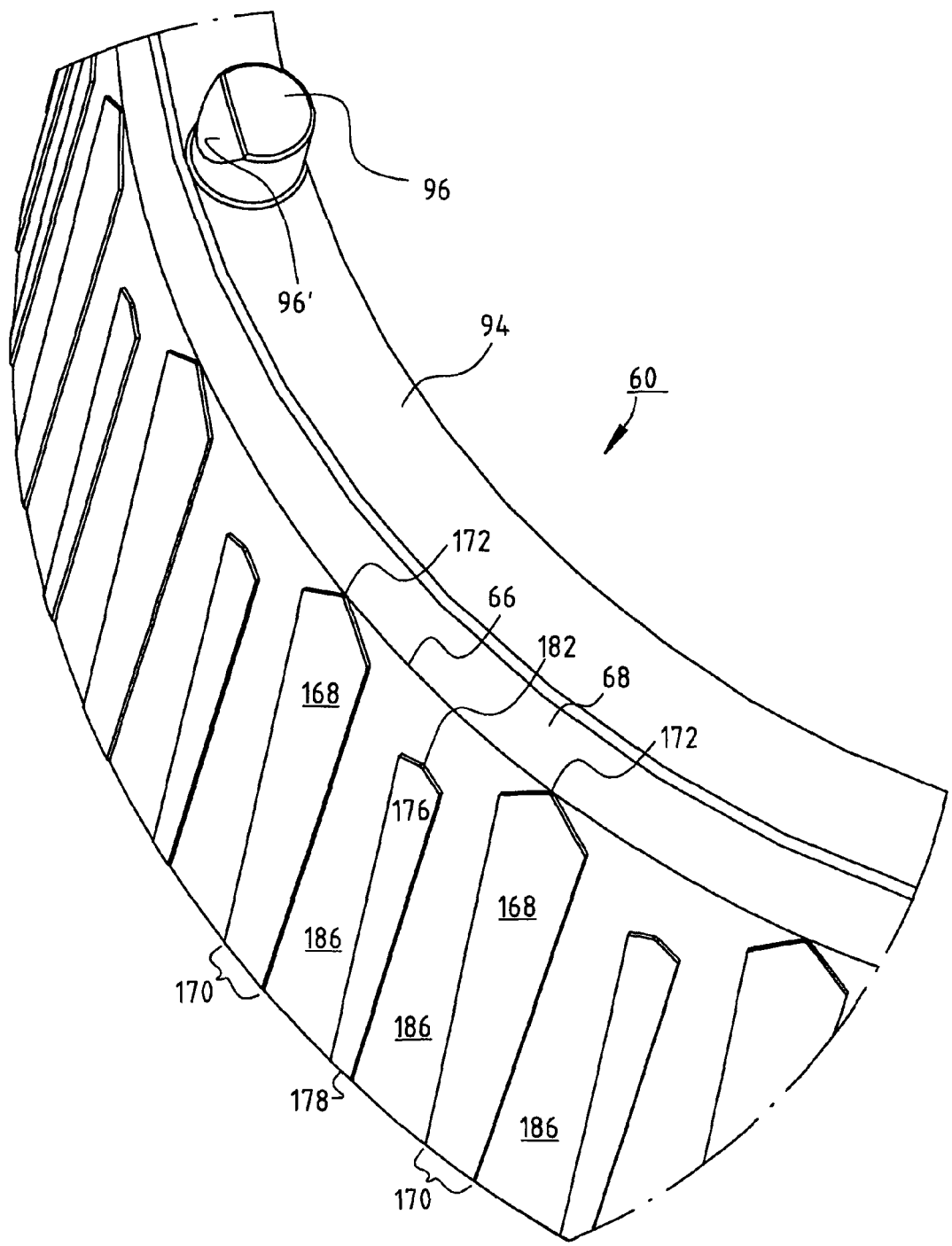
FIG. 14 is an enlargement of a detail of FIG. 13.

FIG. 13 and FIG. 14 show a fifth exemplifying embodiment. In this, the relief-like outer side 61 of ring magnet 60 has a very simple configuration that also largely simplifies production by means of plastic injection molding. Frustoconical surface 68 extends to the left as far as boundary 66, adjoining which to the left is the substantially cylindrical segment 152 with its relief-like surface structure.

No volumetric flow dividers are arranged on oblique surface 68 in the case of FIGS. 13 and 14. Instead, two types of elongated flat elevations, which act as flow dividers, are provided on cylindrical segment 152. These are on the one hand longer flat elevations 168 that have approximately the same shape as elevations 124 according to FIGS. 9 and 10. They extend from a narrow point 170 at the left end (FIG. 13) to an even narrower point 172 at the right end, which here is located on boundary 66. Proceeding from point 170, they widen over approximately 80 to 95% of their longitudinal extension up to a widest point 174, and then decrease over the remainder up to point 172.

Located between longer elevations 168 are shorter and narrower elevations 176 that extend from a narrow point 178 (left) via a wide point 180 to a tip 182. Tip 182 is at a distance a from boundary 66, and this distance a is equal to approximately 5-15% of the length of flat elevations 168.

FIG. 13 also schematically shows the profile of flow lines 184, and it is evident that here as well, the slightly deeper zones 186 between elevations 168 and 176 are uniformly filled with adhesive compound 59, so that no overflow occurs at the right end of flat zones 186, and the adhesive gap (between magnetic yoke 56 of FIG. 1 and ring magnet 60 of FIGS. 13 and 14) is uniformly filled with adhesive compound 59 during assembly in order to achieve an optimum mechanical bond.

As the examples show, numerous possible variations exist within the scope of the invention.

What is claimed is:

1. An electric motor that comprises:
a stator (30);
a rotor (26) including a cup-like rotor part (56) having an inner surface (58) and a ring magnet (60) adhesively bonded in the latter,
which ring magnet (60) has an outer circumference (61) on which are formed elevated surfaces (84) and depressed surfaces (86) that extend at least partly in a longitudinal direction of the ring magnet (60);
said rotor part (56) has an open end (55) adapted for insertion into said ring magnet (60); and wherein
a portion of said ring magnet (60) which, after assembly, is remote from said open end (55) of said rotor part (56), is formed with an oblique surface (68) whose radial spacing from said inner surface (58) increases as a function of distance from said open end (55), said oblique surface (68) and said rotor part (56) defining, between them, a circumferentially extending void (69) which interconnects at least a plurality of said depressed surfaces (86; 122; 164; 186) formed in said ring magnet.

2. The electric motor according to claim 1, in which the oblique surface provided on the ring magnet (60) is implemented as part of a frustoconical segment (68) of the ring magnet (60).

3. The electric motor according to claim 1, in which the outer circumference (61) of the ring magnet (60) at least locally is congruent with a hypothetical cylindrical enveloping surface (106).

4. The electric motor according to claim 1, in which the outer circumference (61) of the ring magnet (60) is formed with depressed surfaces (86, 88) in the manner of a relief-like structure.

5. The electric motor according to claim 4, in which the width of at least a portion of the depressed surfaces (122; 164; 186) decreases, at least locally, away from the open end (55) of the cup-like rotor part (56).

6. The electric motor according to claim 1, in which there are provided, on the side of the rotor (26) facing away from the open side (55) of the cup-like rotor part (56), elements (84; 118; 124, 138; 154; 168, 176) on the ring magnet (60) which are configured to increase, upon assembly, uniformity of flow of adhesive compound (59) into the depressed surfaces (86; 164).

7. The electric motor according to claim 6, in which an edge (132) is constituted at the transition from one depressed surface to one elevated surface, so that the elevated surface radially protrudes above radially lower areas of the ring magnet surface (61) that are to be adhesively bonded.

8. The electric motor according to claim 7, in which at least one edge (132) is implemented in the form of a bevel that forms a positively engaged connection with the adhesive compound (59) after said compound has cross-linked, so as thereby to discourage any change in the position of the ring magnet (60) relative to the cup-like rotor part (56).

9. The electric motor according to claim 1, in which the ring magnet (60) is manufactured, by plastic injection molding, from a material that has a silicone content.

10. The electric motor according to claim 1, in which the ring magnet (40) is manufactured, by plastic injection molding, from a granulate that contains plastic grains into which particles of hard ferrites are embedded.

11. The electric motor according to claim 1, in which the ring magnet (60) contains silicone.

12. The electric motor according to claim 3, in which the average value of the depth, referred to the enveloping surface (106), of the depressed surfaces (86; 122; 164; 186) is less than one millimeter.

13. The electric motor according to claim 12, in which the average value is less than 0.5 mm.

14. The electric motor according to claim 1, wherein the ring magnet (60) is manufactured, by sintering, from a material that has a silicone content.

15. The electric motor according to claim 1, wherein the ring magnet (60) is manufactured, by sintering, from a granulate that contains plastic grains into which particles of hard ferrites are embedded.

* * * * *